United States Patent [19]
Gomond

[11] 3,750,272
[45] Aug. 7, 1973

[54] MACHINING CONTACT LENSES OF FLEXIBLE MATERIAL
[75] Inventor: Gerard Gomond, Paris 17e, France
[73] Assignee: Essilor International (Compagnie Generale D'Optique), Joinville le Pont, France
[22] Filed: Jan. 18, 1971
[21] Appl. No.: 107,068

[30] Foreign Application Priority Data
Jan. 22, 1970  France .............................. 7002216

[52] U.S. Cl. ...................... 29/558, 29/557, 51/284, 351/177
[51] Int. Cl. ........................................ B23p 13/04
[58] Field of Search .................. 29/558, 557, 33 R, 29/559; 51/284; 351/160, 177; 82/1, 2, 1.4

[56]  References Cited
UNITED STATES PATENTS
| | | | |
|---|---|---|---|
| 3,030,859 | 4/1962 | Elliott, Jr. ............................. | 88/54.5 |
| 3,078,560 | 2/1963 | Vosburg .............................. | 82/1.4 X |
| 3,145,506 | 2/1964 | Vegors et al. ....................... | 51/284 X |
| 3,160,039 | 12/1964 | Rocher et al. ...................... | 83/13 |
| 3,301,105 | 1/1967 | Morris ................................... | 82/14 |
| 3,423,886 | 1/1969 | Schpak et al. ...................... | 51/281 |
| 3,528,326 | 9/1970 | Kilmer et al. ....................... | 27/558 X |

*Primary Examiner*—Charles W. Lanham
*Assistant Examiner*—Victor A. DiPalma
*Attorney*—Young & Thompson

[57]  ABSTRACT

A method for machining contact lenses of flexible material such as silicone. The lens is centered on two rotary spindles of which one is a driving spindle and is clamped therebetween. An annular supporting member having a surface with the same curvature as the face of the lens maintains the shape of the flexible lens during rotation of the lens until it is hardened by the spraying of a jet of cooling fluid which may be liquid nitrogen or liquid air. The spraying of the lens continues while the diameter is reduced, if such reduction is necessary. The supporting member is then removed and the peripheral edge of the lens is machined.

9 Claims, 7 Drawing Figures

PATENTED AUG 7 1973 3,750,272
FIG.1
FIG.2
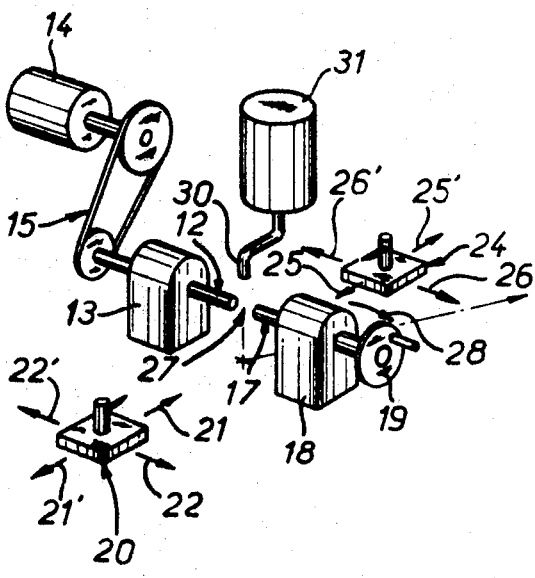
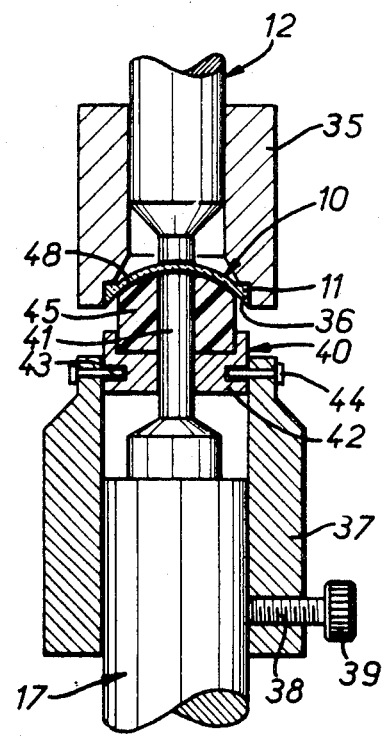
FIG.3A FIG.3B FIG.3C FIG.3D
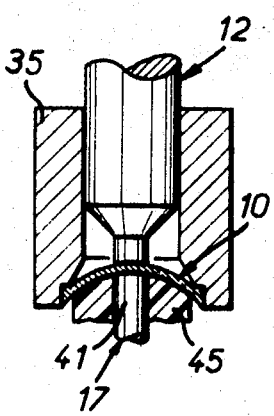 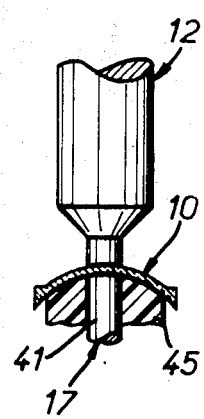 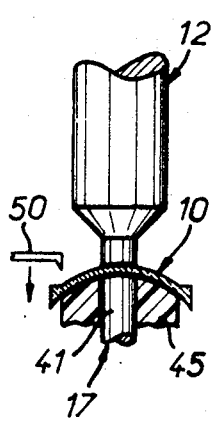 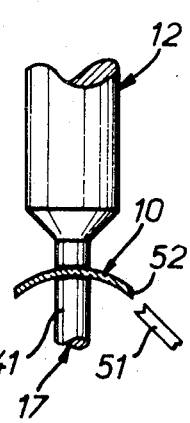
INVENTOR
GERARD GOMONE
BY Young + Thompson
ATTYS.

MACHINING CONTACT LENSES OF FLEXIBLE MATERIAL

The present invention relates in a general way to the machining of contact lenses of flexible material.

Lenses of this kind are well known per se. They can be obtained by pouring a suitable synthetic material, silicone for example, into moulds, and are preferably subjected subsequently to a treatment intended to render them water-absorbent, for example by radio-chemical grafting of N-vinyl-pyrrolidone.

After their moulding and before this grafting treatment, these lenses must be reduced to correct diameter and machined. The reduction to diameter consists of the elimination of the excess peripheral portion of a rough lens, in order to bring the latter to a diameter suitable for its use, and the machining consists of an appropriate thinning of the edges of a lens of this kind reduced to correct diameter.

However, the flexibility of the lens due to the nature of its constituent material and also to its small thickness renders the correct execution of these diameter reducing and machining operations difficult.

In fact, when this machining is carried out in a conventional manner on a machine comprising two rotating spindles, between which the lens to be machined is gripped, it is necessary to centre this lens on the said spindles, and this centering, carried out by hand up to the present day, is rendered difficult and delicate due to the flexibility and small thickness of such a lens.

In addition, during its machining, the lens is the seat of deformation due to centrifugal force, this deformation resulting most frequently in a flattening of its curvature and in consequence in a variation in diameter.

The present invention has for its object a method and a device which enable these difficulties to be overcome, and in consequence permitting the machining of flexible contact lenses just as easily and also as effectively as in the case of rigid contact lenses.

According to the invention, for the machining of a contact lens of flexible material, the latter is placed between two rotating spindles, of which one at least is a driving spindle, the lens is centered on the said spindles, the spindles are brought close to each other so as to hold the lens by clamping, the thrust of one of the faces of the lens is absorbed by an annular supporting punch, at least the driving spindle of the said two spindles is set in rotation, the lens and the extremities of the said spindles and of the said punch are sprayed by a jet of cooling fluid, the diameter of the lens is reduced as required, the supporting punch is withdrawn and the lens is machined.

According to a first form of application, the centering of the lens on the rotating spindles is effected mechanically by means of a sleeve mounted slidably on one of the spindles. Preferably, but not necessarily, with a view to facilitating its subsequent centering, the lens is provided during its moulding with a peripheral reinforcing shoulder which advantageously improves its rigidity.

In an alternative form, the centering of the lens on the rotating spindles is carried out optically by means of a focometer placed on the axis of the spindles.

According to another alternative form, the centering of the lens is effected mechanically, as described above, but starting with a lens reduced to diameter by punching out, on a focometer which has been employed, prior to this reduction to diameter, to centre the lens with respect to its optical centre.

However this may be, spraying by means of a cooling fluid, which may for example be nitrogen or liquid air, advantageously gives the lens, after its centering, sufficient rigidity for it to be suitably machined.

This rigidity is then effective when the lens is advantageously supported by a supporting punch, preferably chosen so as to have in contact with the said lens, a supporting surface having a radius comparable with that of the corresponding face of the said lens.

This arrangement makes it possible for the lens to retain permanently its dimensional characteristics, and prevents subsequently taking a deformation of any kind. Its machining is thus effected under the best conditions.

In particular, the lens is not liable to be deformed between the operations of reducing to diameter and machining, since it always keeps its rigidity due to its continuous spraying by a cooling fluid. In addition, its initial centering remains unchanged, the operations of reducing to diameter and machining being advantageously carried out continuously on the same device.

The setting in rotation of the driving spindle is preferably carried out in two stages. In a first stage, this rotating spindle is started-up at reduced speed, less than 1,000 r.p.m., for example, until the lens and parts in contact therewith have been completely cooled by the jet of cooling fluid, this being done so as to prevent centrifugal force from deforming the lens while it is still flexible. Then, in a second stage, the rotating spindle is brought up to full speed, namely to a speed higher than 15,000 r.p.m. for example, suitable to enable reducing to diameter and machining of the lens to be carried out.

The characteristic features and advantages of the invention will furthermore be brought out in the description which follows below by way of example, reference being made to the accompanying drawings, in which:

FIG. 1 is a view in diagrammatic perspective of a machining device or apparatus according to the invention;

FIG. 2 is a view in partial axial section of the rotating spindles of this device;

FIGS. 3A to 3D show to different scales, a part of FIG. 2, and each illustrates respectively a machining phase of a lens of flexible material;

Figure 4:
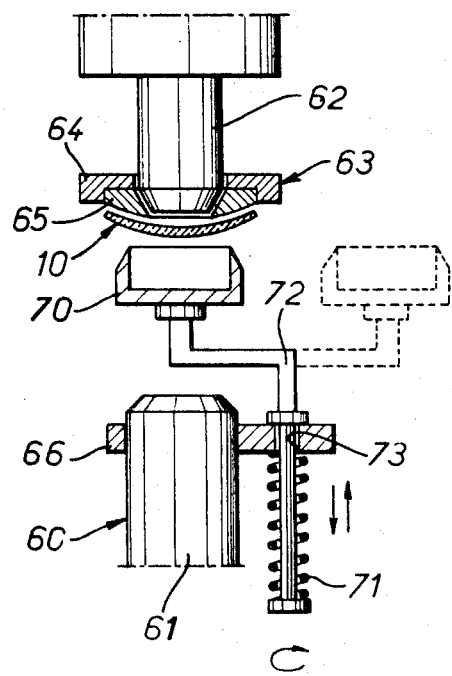
FIG. 4 is a diagrammatic view in axial section of a device for reducing to diameter according to the invention, capable of being associated with the machining device of FIG. 1.

A lens of flexible material is indicated in these drawings by the general reference 10. This lens is obtained in known manner by pouring a suitable synthetic material, silicone for example, between two rigid half-moulds. By way of example, the following overall dimensions may be indicated:

| | |
|---|---|
| Peripheral diameter | 14 mm. |
| Internal radius | 7.6 mm. |
| External radius | 8.3 mm. |
| Thickness | 0.2 mm. |

As will be readily understood, due to its small thickness and to the actual nature of its constituent material, a lens of this kind is only an extremely flexible skin and does not in any case have sufficient stiffness to be immediately machined.

Preferably but not necessarily, the lens 10 is provided by moulding with a peripheral shoulder 11 which improves its rigidity.

FIG. 1 shows diagrammatically a machining device, in which the constituent elements, taken individually, are well known in themselves. They will not therefore be described in detail below. It is only necessary to specify that such a device comprises: a spindle 12 rotatably mounted in a frame block 13 and driven in rotation by a motor 14 through the intermediary of a transmission 15 of any kind; a spindle 17 rotatably mounted in a frame block 18 and movable axially in this frame block by means of an operating crank-handle 19; a diameter-reducing tool-carrier 20 movably mounted perpendicularly to the spindles 12, 17 and parallel to these latter, as indicated diagrammatically by the arrows 21, 21' and 22, 22' respectively; A machining tool-carriage 24 movably mounted perpendicularly to the spindles 12, 17 and parallel to these latter, as indicated diagrammatically by the arrows 25, 25' and 26, 26' respectively.

The machining tool-carrier slide 24 is also movably mounted about an axis perpendicular to the rotating spindles 12, 17 and passing substantially through the working zone 27 of these latter, as shown diagrammatically by the arrow 28. A similar arrangement can be adopted for the diameter-reducing tool-carrier slide 20, for reasons which will become apparent later.

According to the invention, a device of this kind is completed by a nozzle 30 mounted directly above the working zone 27 of the rotating spindles 12, 17 for spraying the latter with a cooling fluid.

To this end, this nozzle 30 is coupled to a tank 31 containing such a cooling fluid and arranged above the spindles 12, 17 for gravity feed of the cooling fluid.

This fluid is chosen so as to have a temperature lower than −100°C.; this may be for example liquid air or liquid or gaseous nitrogen, the liquefaction temperature of which is known to be −173°C.

Experience has shown that this temperature is amply sufficient to give the lens 10 a rigidity sufficient to permit its machining, whereas the use of solid carbon dioxide is ineffective in this field. As cold temperatures render the materials more fragile, the flow-rate must be a function of the fluid chosen and of the constituent material of the lens, in order to avoid excessive fragility of this latter.

According to the invention and as can be seen from FIG. 2, a sleeve 35 is slidably mounted on the rotating spindle 12, and this sleeve is provided at its extremity with an annular housing 36, the diameter of which is substantially equal to that of the lens 10 to be machined. 41 of smaller diameter, of the Similarly, and according to the invention, a sleeve 37 is slidably mounted on the rotating spindle 17, it being possible to fix this sleeve for rotation on this spindle by a cone-pointed grub screw 38 with a knurled head 39. This sleeve 37 carries an annular supporting punch 40 engaged on one extremity of smaller diameter, of the rotating spindle 17.

The supporting punch 40 consists of a rigid ring 42, of metal for example, having an annular groove 43, in which are engaged studs 44 carried by the sleeve 37, and a supporting piece 45 rigidly fixed in an appropriate manner on the ring 42. The supporting punch 40 is thus free for rotation with respect to the sleeve 37 on which it is carried.

The transverse outer face 48 of the supporting piece 45 preferably has a radius of curvature substantially equal to the internal radius of the lens 10 to be machined. To this end, the supporting piece is advantageously produced by moulding a material of any kind in a mould having the same curvature as the lens 10, and this material, synthetic material for example, is preferably chosen to be relatively soft, for reasons which will become apparent later. 6

The machining of the lens 10 is then effected in the following manner:

The lens is placed between the rotating spindles 12, 17 and is then capped by the sleeve 35 which ensures its centering on the said rotating spindles; the supporting piece 45 is then brought into contact with the lens 10, in continuity with the transverse outer face of the extremity 41 of smaller diameter of the spindle 17, and the clamping together of the spindles 12, 17 is effected by means of the crank-arm 19 so as to hold the lens 10 in its centered position (see FIG. 3A).

The sleeve 35 is then withdrawn and the rotating spindle 12 is started-up at a reduced speed, less than 1,000 r.p.m. for example, the assembly of the lens 10 and the extremities of the spindles 12, 17 and of the piece 45 being sprayed with the cooling fluid contained in the tank 31 until the lens 10 has been completely cooled; the rotating spindle 12 is then run-up to full speed, at a speed higher than 15,000 r.p.m. for example (see FIG. 3B); the supporting piece 40 ensures by its shape that the rigid configuration taken by the lens 10 during its cooling is identical with its initial configuration.

The diameter-reducing tool-carrier slide 20 is brought-up to the working zone 27 of the rotating spindles 12, 17, and by displacement of this slide and therefore of the diameter-reducing tool 50 which it carries, parallel to the spindles 12, 17, the machining of the lens 10 to correct diameter is effected as shown in FIG. 3C; in such a case, this diameter reduction is thus effected parallel to the axis of the lens. In an alternative arrangement, if the slide 20 can be pivoted about an axis perpendicular to the spindles 12, 17, as suggested above, the reduction to diameter is effected perpendicularly to the faces of the lens 10, which is preferable for a uniform removal of material during subsequent machining. However this may be, the preferably soft nature of the supporting piece prevents any kind of damage to the diameter-reducing tool, and this supporting piece ensures the correct holding of the lens during machining to diameter.

The sleeve 37 is then caused to slide on the rotating spindle 17, without stopping the rotation of this latter until the supporting piece 45 is completely withdrawn, and by displacement of the machining tool-carrier slide 24 the machining tool 51 carried by this latter is brought into contact with the reduced edge 52 of the lens 10, for the machining of this edge, as shown in FIG. 3D.

This machining operation is made possible, as explained above, by the rigidity given to this lens by cooling, the spray of cooling fluid being maintained during the whole period of the diameter-reducing and machining operations.

FIG. 4 relates to an alternative arrangement, in which the diameter-reduction of the lens is carried out before it is passed into the machining device described above.

This diameter-reducing operation is carried out on a focometer 60 of which there has been shown diagrammatically the eye-piece 61, the objective at 62 and the object carrier 63 which comprises a supporting ring 64 and a rubber damping ring 65.

On the frame 66 of the eye-piece, or on a portion fixed to this frame, a cutting out device 70 is rotatably mounted, this device being also movable axially against the force of a spring 71. This cutting-out device is carried for that purpose by an elbowed rod 72 which passes through an opening 73 in the frame 66. Thus it is movable between a working position shown in full lines, for which it is in the axis of the focometer, and a position of rest shown in broken lines, for which it is moved away from that axis.

In the working position, by an axial movement it is capable to reduce the diameter of the lens 10 by punching out, the lens having previously been centered optically on the focometer.

The machining of the lens 10 is then carried out as previously on the device described above, this lens being centered mechanically on this device by means of the sleeve 35.

It will be understood that the present invention is not limited to the forms of embodiment described above but covers any alternative form of construction, especially as regards the centering of the lens on the machining device, it being also possible to effect this centering by means of a focometer. To this end, and in accordance with an alternative form (not shown), the spindles 12, 17 are bored axially in their length and there is placed at the extremity of one of these spindles the eye-piece of a focometer and at the extremity of the other spindle, the glass-carrier of this focometer.

Furthermore, in the preceding text, the spraying of the lens with a cooling fluid is effected by the fall of this fluid under simple gravity. In an alternative form this spraying can be effected by a jet of this fluid under pressure. The essential is to ensure a general cooling effect on the whole device which secures the lens, so as to prevent heating of this latter by this device, due especially to the operation of this latter.

What I claim is:

1. A method of machining the peripheral edge of a contact lens of flexible material, comprising placing the lens between rotatable coaxial spindles; centering the lens on one said spindle; bringing the spindles close to each other to clamp the lens therebetween; supporting one of the faces of the lens on the surface of an annular support member having the same curvature as said one of the faces; spraying the lens with a jet of cooling fluid while rotating said spindles and lens and support member together as a unit; moving said support member away from the lens; machining the peripheral edge of the lens thus hardened; and continuing said spraying during the machining.

2. A method as claimed in claim 1, and reducing the diameter of the lens before the removal of the supporting member.

3. A method for machining the peripheral edge of a flexible contact lens, comprising centering and clamping the lens between coaxial rotary spindles, supporting one face of the lens on an annular support surface of the same shape as the lens, setting at least one of the spindles in rotation for rotating the lens, cooling the lens until hard, moving the support surface away from the lens, and machining the peripheral edge of the lens while continuing the cooling.

4. A method as claimed in claim 1, in which the centering of said lens is effected by a sleeve slidably mounted on one of the spindles.

5. A method as claimed in claim 4, in which the lens initially has a peripheral reinforcing shoulder for facilitating its centering.

6. A method as claimed in claim 1, in which said lens is centered by means of a focometer disposed on the axis of said rotating spindles, said spindles being axially bored for that purpose.

7. A method as claimed in claim 2, in which said centering of the lens with respect to its optical center is effected on a focometer, said reducing of the diameter of the lens being effected by punching out a central portion of the lens while the lens is disposed on said focometer.

8. A method as claimed in claim 2, in which the running-up to speed of said spindles is effected in two stages, first at reduced speed, lower than 1,000 r.p.m. for the complete cooling of the lens by said cooling fluid, and then at full speed, higher than 15,000 r.p.m. for reducing the diameter and machining of said lens.

9. A method as claimed in claim 1, in which said cooling fluid is a liquefied gas at a temperature lower than $-100°$ C.

* * * * *